(12) United States Patent
Hanus et al.

(10) Patent No.: US 8,121,992 B2
(45) Date of Patent: Feb. 21, 2012

(54) LOG DATA STORE AND ASSEMBLER FOR LARGE OBJECTS IN DATABASE SYSTEM

(75) Inventors: Michael J. Hanus, Cedar Park, TX (US); Kenneth M. McDonald, Cedar Park, TX (US); Kenneth J. Durfee, Round Rock, TX (US); Bobby B. Baty, Austin, TX (US)

(73) Assignee: BMC Software, Inc., Houston, TX (US)

( * ) Notice: Subject to any disclaimer, the term of this patent is extended or adjusted under 35 U.S.C. 154(b) by 0 days.

(21) Appl. No.: 12/762,592

(22) Filed: Apr. 19, 2010

(65) Prior Publication Data
US 2010/0205157 A1    Aug. 12, 2010

Related U.S. Application Data

(63) Continuation of application No. 11/695,114, filed on Apr. 2, 2007, now Pat. No. 7,730,044.

(51) Int. Cl.
*G06F 7/00* (2006.01)
*G06F 17/00* (2006.01)

(52) U.S. Cl. ......... 707/695; 707/741; 707/795; 707/954

(58) Field of Classification Search .................. 707/792, 707/695, 741, 795, 954
See application file for complete search history.

(56) References Cited

U.S. PATENT DOCUMENTS

| | | | |
|---|---|---|---|
| 6,418,454 B1 * | 7/2002 | Toohey | 1/1 |
| 6,434,662 B1 * | 8/2002 | Greene et al. | 711/108 |
| 2002/0046211 A1 | 4/2002 | Fragapane et al. | |
| 2002/0065792 A1 | 5/2002 | Bonner et al. | |
| 2003/0033317 A1 * | 2/2003 | Ziglin | 707/102 |
| 2003/0115221 A1 * | 6/2003 | Goode et al. | 707/200 |
| 2004/0030703 A1 | 2/2004 | Bourbonnais et al. | |
| 2005/0192869 A1 * | 9/2005 | Maeda et al. | 705/26 |
| 2008/0098083 A1 * | 4/2008 | Shergill et al. | 709/217 |

* cited by examiner

*Primary Examiner* — John Cottingham
*Assistant Examiner* — Nicholas Allen

(57) ABSTRACT

A mechanism works in conjunction with a DB2® Log and an analysis tool, such as BMC's Log Master™, to handle logged data for Large Objects (LOBs) stored in tables of a DB2 database system. A plurality of controls track data logged for the LOBs. The mechanism reads log records from a DB2 Log and uses the controls to determine which of the tracked LOBs is associated with the log records and obtains data from those associated log records. The mechanism builds keys to index the data and stores the keys and the data in a Virtual Storage Access Method store having Key Sequenced Data Sets maintained separate from the log record store for the DB2 Log. When requested by the analysis tool, the data in the store can be reassembled using the keys and map records in the first store that map the logged data for the tracked LOBs.

19 Claims, 7 Drawing Sheets

LOG DATA STORE AND ASSEMBLER FOR LARGE OBJECTS IN DATABASE SYSTEM

CROSS-REFERENCE TO RELATED APPLICATIONS

This is a continuation of U.S. patent application Ser. No. 11/695,114, filed Apr. 2, 2007, which is incorporated herein by reference and to which priority is claimed.

FIELD OF THE DISCLOSURE

The subject matter of the present disclosure relates to handling and managing logged data for Large Object (LOB) data types in a database management system.

BACKGROUND OF THE DISCLOSURE

A database management system (DBMS) manages large databases and provides an operational environment in which stored information can be retrieved or updated. In one type of DBMS, referred to as a relational database system, information is stored in tables, with each table having one or more columns and one or more rows. Each column in a table is referred to as an attribute of the table, and each row in a table is referred to as a record. One well-known example of a relational database management system is the DB2® database management system. (DB2® is a registered trademark of International Business Machines Corporation of Armonk, N.Y.).

When transactions are processed in a DB2 database system (i.e., when there is an insert, update or delete operation made to a record), a DB2 subsystem creates log records and writes them out to a DB2 Log. Once written, the log records can be used for various purposes, such as data recovery, migration, and reporting. In general, the log records contain control information (i.e., Log Sequence Number, transaction identifier connecting the log record to other log records for the same transaction, etc.) and different types of content that depend on what is being logged. One of the most common types of content is an update for which the log record contains data from the first changed byte to the last changed byte or the end of the row.

An example of a software product that can use DB2 log records for various purposes is Log Master™ by BMC. (LOG MASTER is a trademark of BMC Software, Inc. of Houston, Tex.) Log Master is a software tool that can perform transaction log analysis for DB2 and may be used to back-out problem transactions using SQL statements generated from the information in the log records as well as being used to migrate data or report on the same log records. For example, Log Master can analyze the DB2 Log and locate transactions for the purpose of auditing, migration or data recovery. For data recovery, Log Master can generate SQL statements to correct the problem by performing an UNDO or a REDO action, Log Master may also be used to migrate data from a production database to other databases used for backup, historical information, decision support or warehousing.

FIG. 1A shows one process 10 in which Log Master may be used in conjunction with a DB2 Log according to the prior art. In the process 10, Log Master post-processes the DB2 Log 12, which has already been written by techniques known in the art. Log Master adds context to log records, provides control information and complete log images, and allows for decompression of data, among other capabilities beyond those available from the DB2 Log 12. In processing the DB2 Log 12, log readers 14 read the files of the DB2 Log 12 directly and buffer those log records of interest in buffers 16 for log assemblers 18. Generally, there is a log reader and assembler for each member of a data sharing group. A log factory 20 controls the merging of records from the log assemblers 18 and invokes log handlers 22 that are configured to handle the various log records. A logical log builder 24 is then called to produce logical log records that are fed into a base log record output pipe 26, which is also referred to as a Logical Log data pipe. Output processes 30 handle and sort the log records from the Logical Log Data pipe 26 to produce various outputs 40 for the user.

FIG. 1B shows the output processes 30 in more detail. Various pipe handlers 32 handle and sort the logical log records from the Logical Log Data pipe 26 depending on the desired output. For example, Logical Log Data pipe handlers 32 can handle logs for SQL generation, logs generated from DDL operations, logs for load data generation and creation of load control files, logs for reporting, and logs for recovery analysis. The pipe handlers 32 instantiate sorted pipes to feed logical log records to sort routines 34 and 36 so that the logical log records may be processed in correct order for various output handlers 38. The first sort routines 34 are E15 sorts that are written to operate concurrently with one another. The second sort routines 36 are E35 sorts that process their input data serially. After the sorting routines 34 and 36, various sorted output handlers 38 produce outputs 40, which can include (but not limited to), SQL file and template outputs, catalog record details, load data and control outputs, report outputs, recovery analysis outputs, and logical log data outputs.

Like most modern database management systems, the DB2 database system is able to store and manage large data using Large Objects (LOBs). There are three general types of LOBs: Binary Large Object (BLOB) for binary data; Character Large Object (GLOB) for single byte character data; and Double Byte Character Large Object (DBCLOB) for double byte character data. Some examples of LOBs include images of checks, bonds, claim forms, and the like. LOBs can also be XML or HTML documents, audio or video files, etc. Some LOBs may have very structured data, while others may have unstructured or simple data. The primary use of LOBs is to store column data that is larger than the limit for a base table.

FIG. 1C shows how the DB2 database system 100 manages LOBs according to the prior art. LOB data is stored differently than conventional data in the DB2 database system 100 because LOB data is large (up to 1-byte less than 2-GB) and is computationally expensive to manage and manipulate. To help manage the LOBs, the actual data for the LOBs is stored separately in LOB tablespaces 150 and 152, each having auxiliary tables 151 and 153 respectively. The base table 120 for the LOB data merely contains information identifying how to index into and access the LOB in the corresponding auxiliary table 151, 153. For example, the base table 120 defines one or more LOB columns 122 that only store information about the LOB data. The auxiliary tables 151, 153 store data for the LOB columns 122 outside the base table 120 in which they are defined.

There are a number of constraints on the way LOB information is arranged in the base tables 120. Each type of LOB (i.e., BLOB, CLOB and DBCLOB) that is identified in the base table 120 requires a separate LOB column 122. Regardless of how many there are, each LOB column 122 contains a two-byte indicator field 124 and a two-byte version field 126. The indicator field 124 indicates whether there is LOB data or not. If this field 124 is NULL or has zero length, there is no data stored in the auxiliary table 153 for the LOB column 122.

The version field 126 identifies a version of the current LOB data for a given row in the base table 120.

In addition to the LOB columns 122, the base table 120 also contains one ROWID column 128 that stores usually system-generated values to identify and index the actual LOB data for a given row in the base table 120. During operation, an application program 140 can use a LOB identifier 130 to access the actual LOB data stored in the auxiliary tables 151, 153 in the LOB tablespaces 150, 152.

There are a number of constraints on the way LOB data can be stored in LOB tablespaces 150, 152 and auxiliary tables 151, 153. For example, each LOB tablespace 150 can only contain information for one LOB column 122 of a corresponding base table 120, and the LOB tablespace 150 cannot be partitioned. If the base table 120 is partitioned, then one LOB tablespace 150, 152 and auxiliary table 151, 153 must be created for each partition of the base table 120 and for each LOB column 122 of the partitioned base table 120. Moreover, each auxiliary table 151, 153 can have only one index (not shown).

As with logging of other data, changes to LOB columns 122 in the base table 120 can be logged by the DB2 database system 100. Using standard techniques discussed previously, the DB2 Log 12 (see FIG. 1A) can store log records of column inserts, updates, and deletes in the DB2 Log files. However, logging LOB data can require large amounts of storage due to the size of the LOBs and can present a number of complex issues. For example, logging must be disabled if the LOB column 122 is larger than 1 GB. Furthermore, BMC's transaction log analysis tool Log Master, does not fully support LOB data types. If logging is enabled on LOB tablespaces, only the REDO (new) value of actual data is logged, and any before images of updates and any data being deleted is not logged for LOBs. Therefore, UNDO processing (resetting to the previous value) cannot be done, but REDO or MIGRATION of these transactions is possible. Thus, Log Master cannot generate SQL undo operations if an SQL change (update or delete) references column data for LOB data type.

Accordingly, there is a need in the art for an efficient means of managing logged data for LOBs in a relational database system, such as the DB2 database system.

DETAILED DESCRIPTION

A system and method according to the present disclosure manages log records for Large Objects (LOBs) in a relational database system, such as the DB2 database system. The disclosed system and method can be used in conjunction with the DB2 Log and Log Master application to improve the handling of LOB log records when performing, data warehousing, transaction back out, auditing, and other operations useful in the art of database management.

Figure 2:
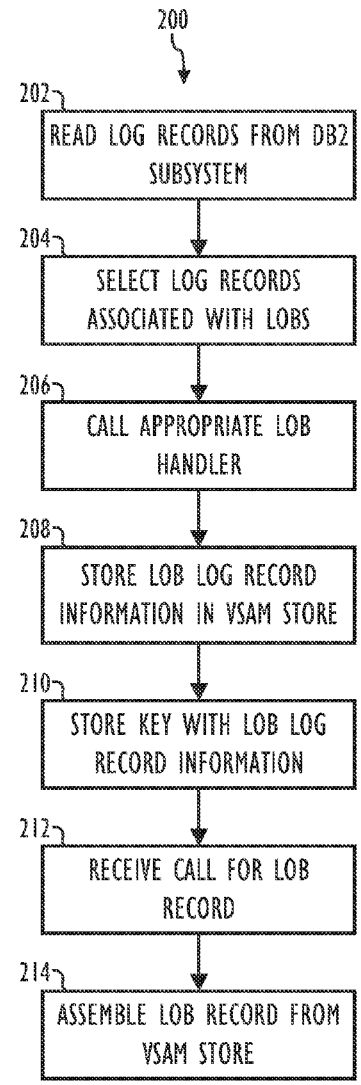
FIG. 2 illustrates, in flow chart form, a method for handling log records for LOB data according to certain teachings of the present disclosure.

In this regard, FIG. 2 shows one example operation of the disclosed system and method 200 in handling log records for LOBs in a DB2 database system. As discussed previously, a DB2 subsystem creates log records when transactions are processed (i.e., when there are inserts/updates/deletes made to records). In conventional logging practices, LOB log records, except for basic column update information, may be ignored because of the various complexities associated with them. Using the disclosed system and method, however, log records are read from the DB2 Log (Block 202), and the log records associated with LOBs are selected for special handling (Block 204). Although the present embodiment obtains logged data from a log (e.g., DB2 Log) associated with the database system, it will be appreciated that the logged data can be obtained from various other sources (databases, files, tables, etc.) and directly from the database system.

Appropriate LOB log handlers are called to handle the LOB log records read from the DB2 Log (Block 206). Information in the LOB log records is stored in a store (Block 208) along with keys used to uniquely identify the records in the store (Block 210). In one embodiment, therefore, logged LOB data and keys are stored together in a single storage element. In an alternative embodiment, the logged LOB data and the keys can be stored in separate locations or stores, which can use any of the suitable file structures available in the art. Preferably, the storage used for the keys and the logged LOB data allows for efficiency in accessing the LOB data with the keys.

To handle the LOB log records, a plurality of controls are created to track data logged for the LOBs stored in tables of the DB2 database system. The controls enable the disclosed system and method to identify tracked LOBs, to determine which of the log records are associated with which of the tracked LOBs, and to link identifying information in the LOB log records to access information used to read and write data in the store.

Once data is in the store, an application may later call for a LOB record when reassembly of the LOB is desired for SQL generation or other reasons discussed previously (Block 212). When such a call is received, the LOB record is assembled from the store by accessing the LOB information with the keys used to uniquely identify the records (Block 214). In this way, operation of the system and method 200 of the present disclosure offers an alternative technique for handling logs of LOB data that is more conducive to the nature and size of LOB data.

Figure 1A:
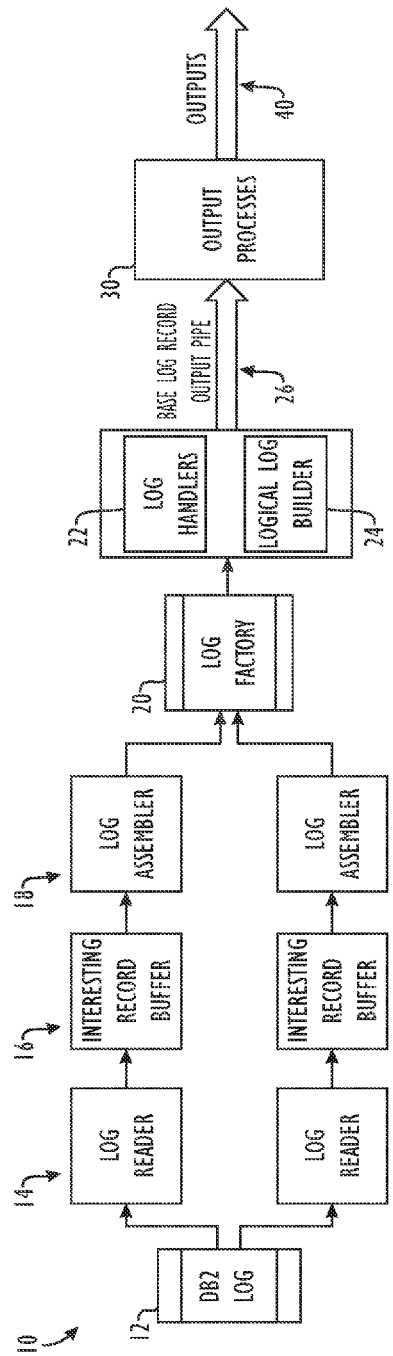
FIG. 1A illustrates one prior art database logging operation.

In addition to the DB2 database system discussed above, IBM has a data management system called Virtual Storage Access Method (VSAM), which is used to organize datasets within a database. One type of dataset organization in VSAM is the Key Sequenced Data Set (KSDS). In KSDS, a key value is used to identify and access each record of a dataset. The key value is a unique identifier that is part of each data record in a dataset. The VSAM KSDS architecture is well known in the art so will not be discussed further. In one embodiment, the store used for the logged LOB records handled by the disclosed system and method is a VSAM store that uses KSDS. The VSAM store is maintained separately from the conventional log record store of the DB2 database system and is maintained separate from the logical log records that have base table column information handled by BMC's Log Master (See FIG. 1A). In this way, the large data of the LOBs is not contained within the base log record output pipe (26; FIG. 1A) of Log Master, and the VSAM store allows for random access to correlate the LOBs to the base table information in the pipe (26) of Log Master.

I. LOB Log Handling Mechanism

Figure 3A:
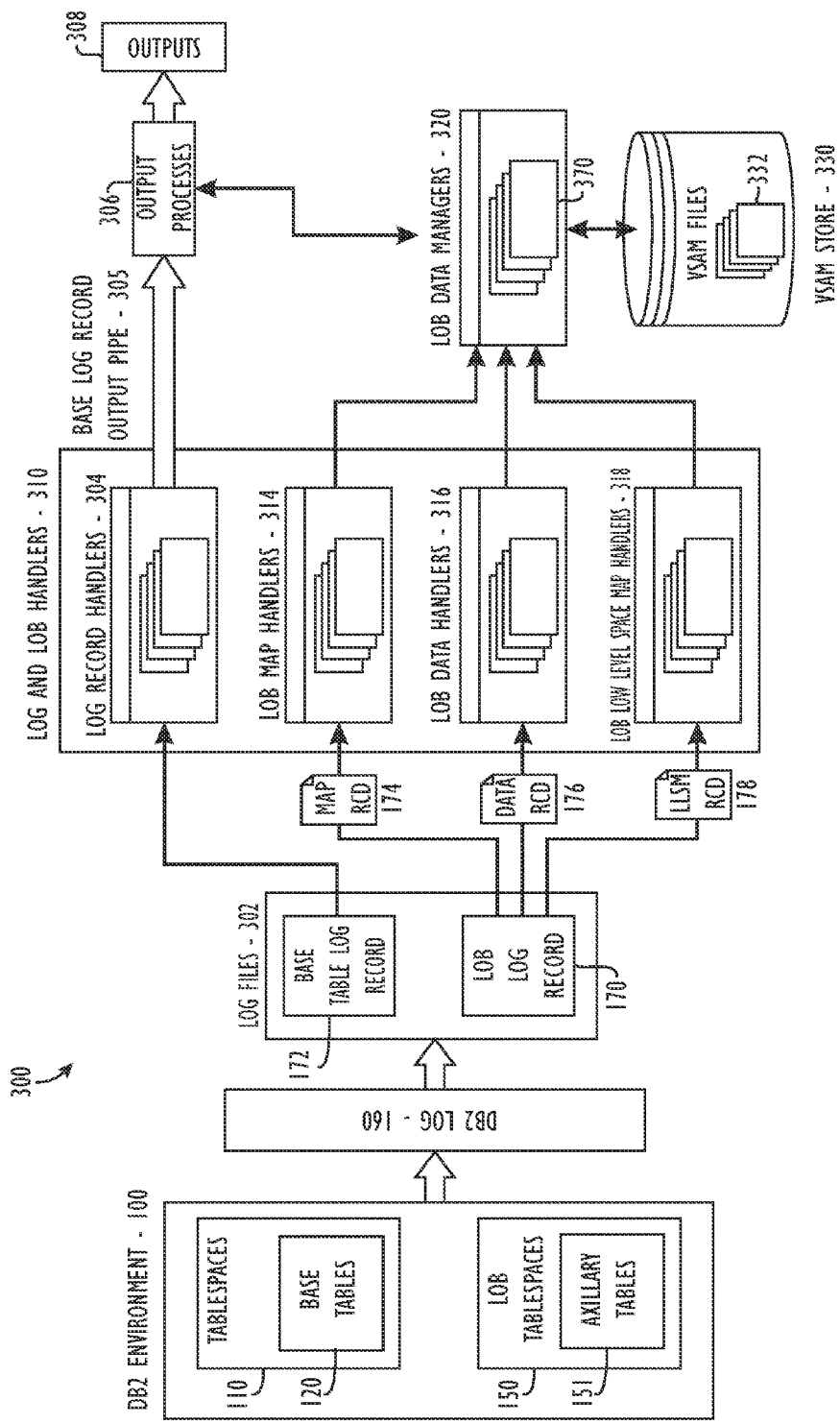
FIG. 3A illustrates one embodiment of a mechanism to handle log records for LOB data according to the present disclosure.

Given the above overview of the disclosed system and method, we now turn to FIG. 3A where one embodiment of a LOB Log Handling Mechanism 300 is illustrated. The Mechanism 300 can be used to efficiently store, retrieve, and log LOB data of a database management system which, for the purposes of the present disclosure, is described in terms of a DB2 relational database system. As discussed previously, the DB2 database system 100 can have partitioned and non-partitioned table spaces 110 with base tables 120 and can have LOB tablespaces 150 with auxiliary tables 151 for LOB data. Transactions, such as inserts, updates, or deletes to records in the DB2 database system 100, are recorded in the DB2 Log 160. Because the DB2 database system 100 uses LOBs, changes to the LOBs can also be recorded in the Log files 302. For example, a LOB column update/insert/delete may be made to a LOB column in a DB2 base table 120, and the Log files 302 can generate LOB log record(s) 170 for that insert/update/delete.

Base table log records 172 and other log records (not shown) are handled by log record handlers 304 and are fed into the base log record output pipe 305. Output processes 306 can then process the log records in the pipe 305 to produce various outputs 308. Thus, the Log files 302, the log records handlers 304, the base log record output pipe 305, and the output processes 306 incorporate the readers 14, buffers 16, assemblers 18, factory 20, handlers 22, log builder 24, pipe 26, processes 30, and other components (not shown) of Log Master discussed previously with respect to FIGS. 1A-1B. In this way, the Mechanism 300 can handle the log records typically handled by the prior art Log Master to produce similar outputs.

In addition to the standard handling of log records as discussed above, the Mechanism 300 can be configured to track some or all of the LOBs in the DB2 database system 100. To track a LOB, appropriate LOB log Handlers 310 are instantiated in the execution services of the computer system utilizing the LOB Handling Mechanism 300. When LOB log records 170 are read, the appropriate LOB log Handlers 310 are called so the information in the LOB log record 170 can be stored according to the techniques discussed below.

A number of LOB log Handlers 310 are used to handle the LOB log records 170. The basic column update information in a base table log record 172 for the LOB can be handled by the previously mentioned log record handler 304 to form part of the base log record output pipe 305 according to the techniques of Log Master discussed with reference to FIGS. 1A-1B. However, other Handlers 310 are used to handle other logged data in LOB log records 170. These other Handlers 310 include LOB Map Handlers 314, LOB Data Handlers 316, and LOB Low Level Space Map Handlers 318. These Handlers 314, 316, 318 use LOB Data Managers 320 to store information in a VSAM store 330 from which the LOB data can be later assembled and used for various purposes.

As their names imply, the LOB Map Handlers 314, LOB Data Handlers 316, and LOB Low-Level Space Map Handlers 318 respectively handle map records 174, data records 176, and low-level space map records 178 logged for a tracked LOB. Details of each of these records (174, 176, and 178) and their corresponding Handlers (314, 316, and 318) will be briefly discussed below and described in more detail later.

The LOB Map Handlers 314 track the LOBs using the map records 174 logged for the LOBs. At least one map record 174 is logged for every insert/update done to the LOB data in the DB2 database system 100. Each map record 174 contains an indication of the total length of its respective LOB and a logical sequence of page numbers and ranges for the LOB's data.

The LOB Data Handlers 316 handle the data records 176 logged for the LOBs. The data records 176 contain data of the LOBs so there may be multiple data records 176 logged to encompass a single change to underlying LOB data in the DB2 database system 100. The LOB Low-Level Space Map Handlers 318 handle the low-level space map records 178 logged for the LOBs. The low-level space map records 178 indicate changes made to manipulated LOB pages that may be due to a rollback or delete operation. In handling these records, the Handlers 318 can determine what needs to be deleted from the VSAM store 330.

Working in conjunction with the Handlers 314, 316, and 318, LOB Data Managers 320 store and retrieve the LOB data for the records 174, 176, and 178 in and from the VSAM store 330. Each LOB Data Manager 320 manages the data for a single LOB column 122 or LOB column partition of a base table 120 with which it is associated. Accordingly, in the illustrative embodiment, there is one LOB Data Manager 320 assigned to each auxiliary LOB tablespace 150. In addition, each LOB Data Manager 320 manages the allocation and de-allocation of a VSAM file 332 in the VSAM store 330 and handles the various insert, update, delete, and reselection operations made to LOB page records in the VSAM file 322.

The VSAM store 330 is external to the DB2 database system and is designed such that each LOB page is stored as one record in a VSAM file 332 of the store 330. Each record in the VSAM files 332 is keyed using Key Sequenced Data Set (KSDS) techniques. In this way, multiple occurrences of a given LOB record (e.g., due to multiple updates to the LOB data within a log range being processed) can be stored in the same VSAM file 332.

II. Control Blocks, Maps, and Entries Used by the LOB Log Handling Mechanism

Figure 1B:
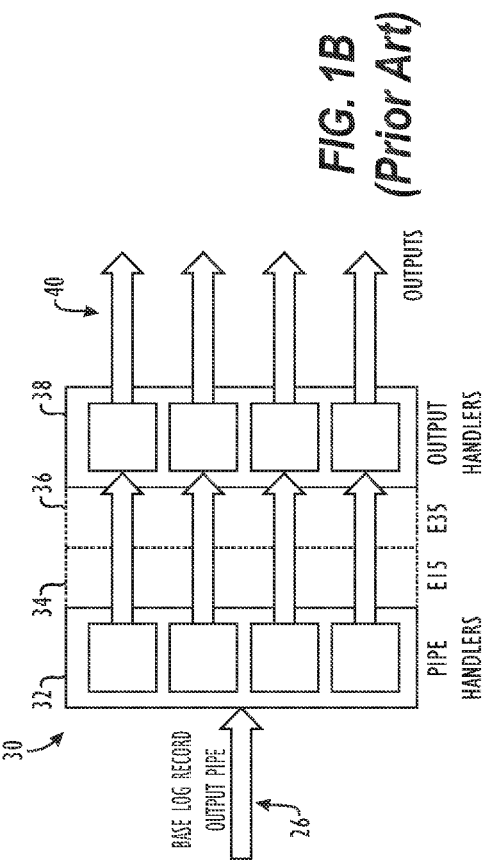
FIG. 1B illustrates the output processes of FIG. 1A in more detail.
Figure 1C:
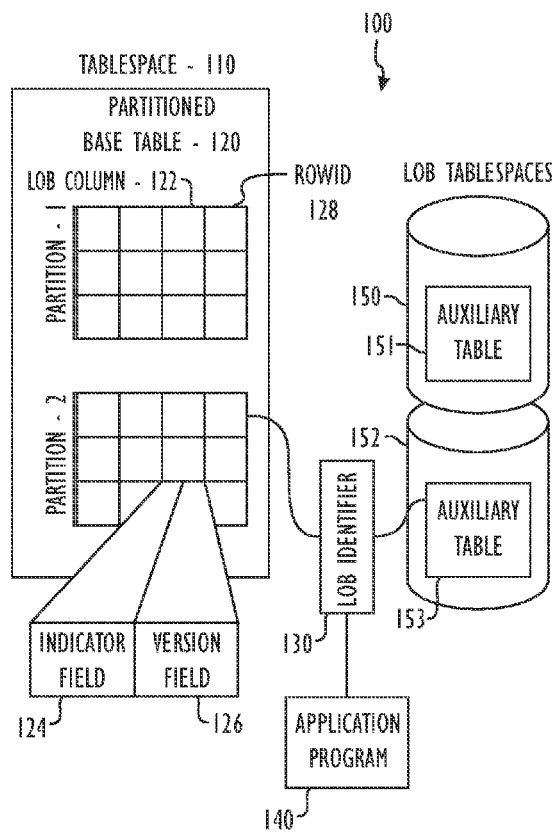
FIG. 1C illustrates how a DB2 database system handles LOBs according to the prior art.
Figure 3B:
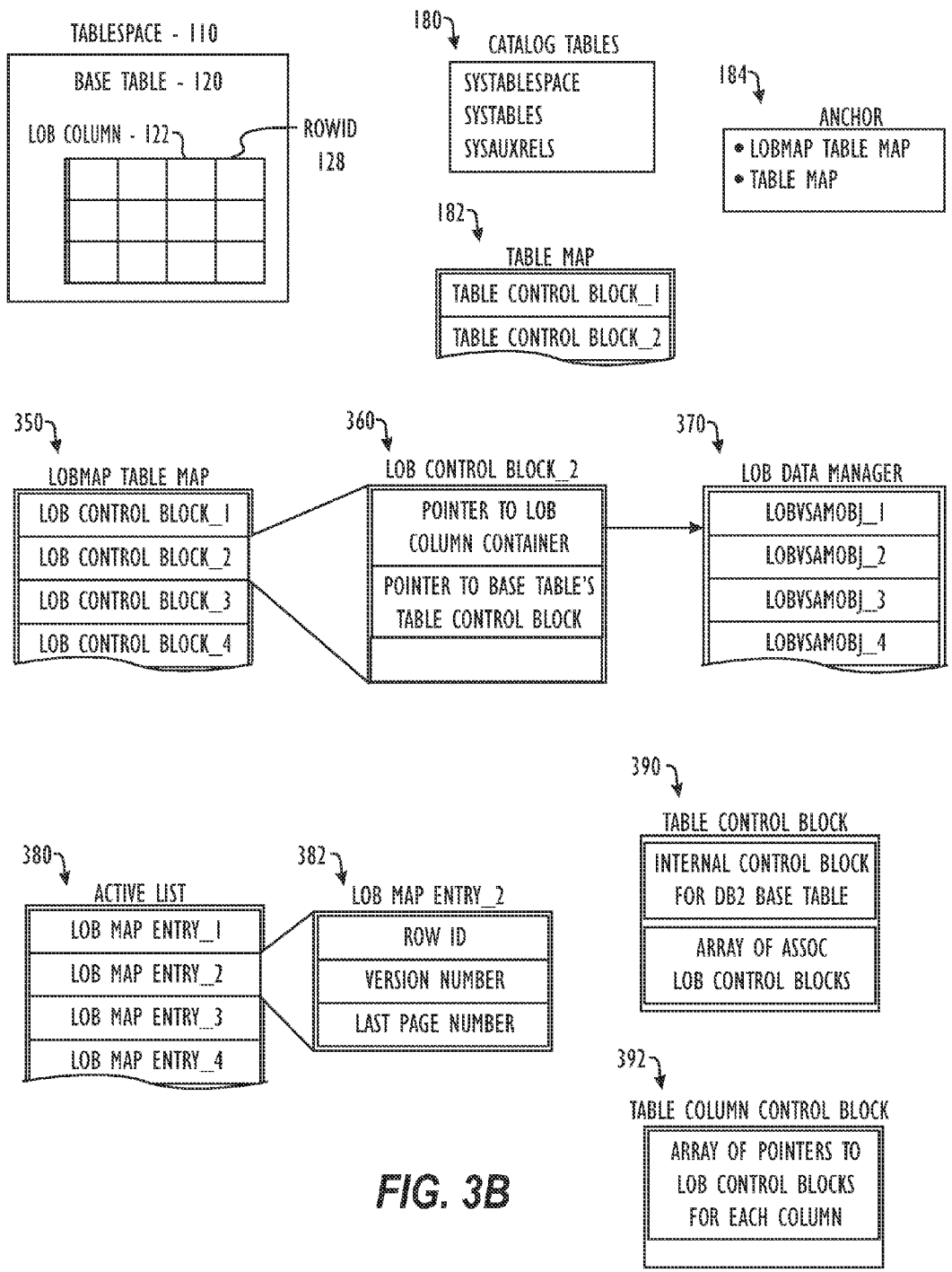
FIG. 3B illustrates various elements of the mechanism illustrated in FIG. 3A.

Before continuing with the discussion of the Handlers 310, we first turn to FIG. 3B, which shows various elements used by the LOB Log Handling Mechanism 300 of FIG. 3A. These elements are introduced here so they can be better understood when described in the context of the Handlers 310 discussed below. Some of the elements are conventional and include tablespaces 110, base tables 120, LOB columns 122 (with indicator and version fields), ROWIDs 128, and catalog tables 180. The Table Map 182 and the Anchor 184 are internal structures used by Log Master (FIGS. 1A-1B). Some of the information for these structures is built from DB2 Catalog table information and some information is internal to BMC Log Master.

Additional elements suited for the LOB Log Handling Mechanism 300 of FIG. 3A include a LOB MAP Table Map 350, LOB control blocks 360, LOB Data Managers 370, an Active List 380, LOB Map Entries 382, Table control blocks 390, and Table Column control blocks 392. The control blocks discussed herein are storage areas for dynamic data.

Apart from how these elements are discussed in the following sections, additional descriptions of these elements are provided in Section V of the present disclosure for further reference.

III. Handlers of the LOB Log Handling Mechanism

We now turn to a discussion of how the various Handlers 310 and Data Managers 320 operate in the Mechanism 300 of FIG. 3A. As mentioned only briefly above, the Mechanism 300 reads the DB2 Log 160 and selects base table log records 172 and the LOB log records 170 associated with LOBs. The LOB log records 170 can include map records 174, data records 176, or low-level space map records 178 as mentioned before. We will first discuss how map records 174 are handled by the LOB Map Handlers 314.

A. Handlers for Logged LOB Map Page Records

Tracking of a given LOB essentially begins with the Mechanism 300 receiving a logged map record 174 associated with a LOB and a LOB Map Handler 314 handling that logged map record 174. Operation of the LOB Map Handler 314 is shown in flow chart form in FIGS. 4A-4C.

Figure 4A:
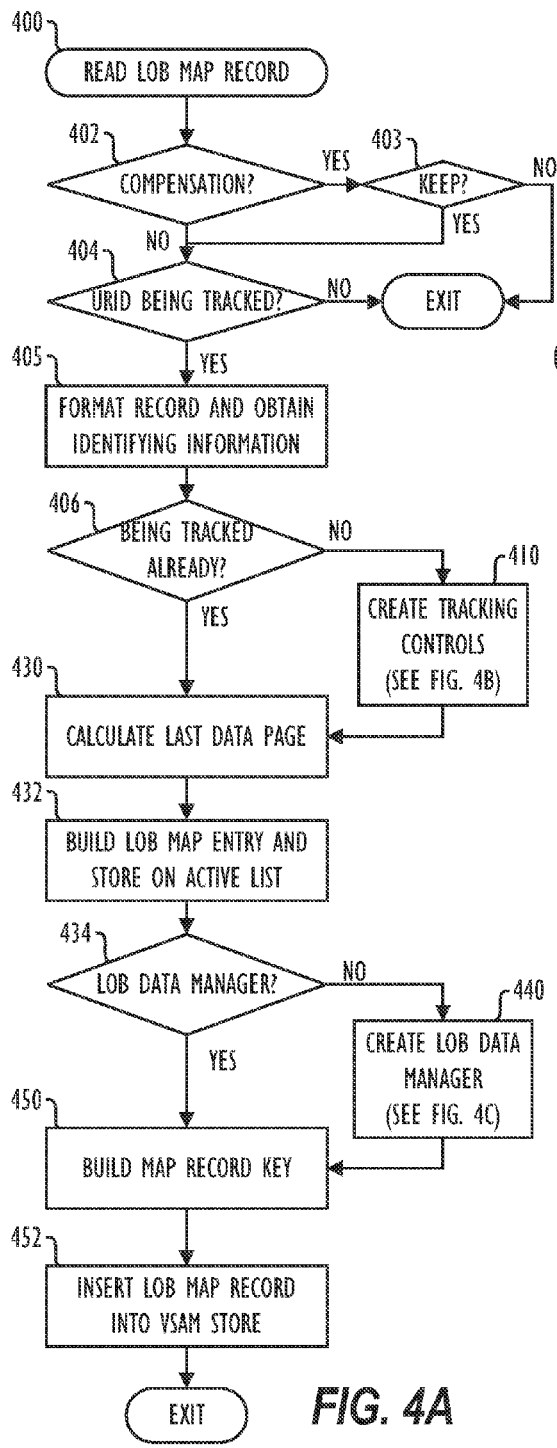
FIGS. 4A-4C illustrate, in flow chart form, one embodiment in accordance with the invention for handling map records of logged LOB data with the mechanism of FIG. 3A.

As initially shown in FIG. 4A, a map record 174 for a LOB is read in the course of reading the DB2 Log 160 (Block 400). Some preliminary checks are first made to this LOB Map log record 174. First, a check is first made to determine whether this LOB Map log record 174 is for a compensation record (Decision 402). If so, a check is made to determine whether compensation records should be kept (Decision 403), and if not, the logged map record 174 is ignored. Second, a check is made to determine whether the unit of recovery identifier (URID) of this logged map record 174 is one that is selected to be tracked or not (Decision 404). As is known, the URID is a relative byte address (RBA) of the first log record (a BEGIN UR) for a unit of recovery in DB2, and the URID appears in all subsequent log records for that same unit of recovery.

If the URID is not one being tracked, the logged map record 174 is ignored. If the URID is one to be tracked, the Handler 314 formats the logged map record 174 to obtain identifying information of the underlying LOB (Block 405) and determines whether the underlying LOB is already being tracked (Decision 406). To do this, the Handler 314 uses the information obtained from the record 174 to search the LOB Map Table Map 350, which is located in the Anchor 184 (See FIG. 3B) and which is an internal array of identification information of LOBs that have been seen before, and to determine if the underlying LOB is already being tracked. If it is the first time this particular LOB has been encountered, the Handler 314 creates tracking controls for tracking the underlying LOB (Block 410) using steps detailed in FIG. 4B.

Once tracking controls are in place for the tracked LOB, the last data page for the tracked LOB is calculated so that the last data page to be read will be known to the Mechanism 300 during later processing of LOB log records 170 form the DB2 Log 160 (Block 430). Using the last page, ROWID, and version number of the LOB, the Handler 314 builds a LOB Map Entry 382 (See FIG. 3B), which is an internal control block containing information to determine if the last data page for the tracked LOB record has been read. Once built, the Handler 314 stores the LOB Map Entry 382 in the Active List 380 (Block 432).

As shown in FIG. 3B, the LOB Map Entry 382 is a control block that contains the ROWID, version number, and last page number to be read for the associated LOB. The Active List 380 having the LOB Map Entry 382 will be accessed in later processing when data records 176 and low-level space map records 178 for tracked LOBs are encountered in the DB2 Log 160, as discussed in Section III (B) and (C).

Once the LOB Map Entry 382 has been added to the Active List 380, the Handler 314 determines if a LOB Data Manager 320 exists for this tracked LOB (Decision 434). If not previously created, an appropriate LOB Data Manager 320 is created (Block 440) using steps detailed in FIG. 4C. The associated LOB Data Manager 320 then builds a map record key and adds this key to the information from the logged map record 174 to create a LOB map record for the store 330 (Block 450). As detailed below, this map record key is a VSAM KSDS key used to organize and search the data for the tracked LOB in the VSAM store 330. Finally, the LOB Data Manager 320 inserts the LOB map record with its key together as a record in the VSAM store 330 so the LOB Data Manager 320 can manage the LOB data in later operations (Block 452).

Figure 4B:
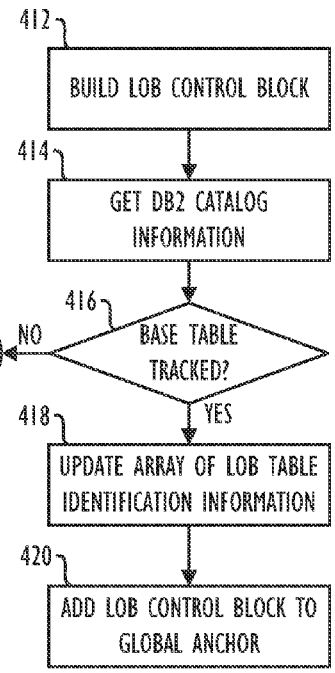

As noted above at Block 410, the LOB Map Handler 314 creates tracking controls for tracking log records 170 for a LOB. As shown in FIG. 4B, the Handler 314 builds a LOB control block as one of the controls for tracking the LOB log records 170 during processing (Block 412). The LOB control block, which is shown in FIG. 3B as element 360, contains a pointer to a LOB Data Manager 370 that itself contains a list of VSAM objects for the LOB. These LOB VSAM objects are used to represent data for the LOB in the VSAM store 330. Further details of the LOB control block and LOB VSAM objects are provided in Section V below.

With the LOB control block 360 built, the Handler 314 populates the LOB control block 360 with catalog information from DB2 catalog tables 180, such as SYSTABLESPACE, SYSTABLES, and SYSAUXRELS. When the controls for tracking this LOB record 174 are complete, a check is performed to determine whether the base table for this LOB record 174 is also being tracked, Using information about the base table 120 for the LOB, for example, the Handler 314 then checks the Table Map 182, which is an internal array of DB2 table identification information, to determine if the objects in the base table 120 associated with the LOB are currently being tracked or not (Decision 416).

If they are not being tracked, the entry of the LOB Map Table 350 listed in the Anchor 184 is left alone. However, a flag indicating whether to use the map is turned off, and the logged map record 174 is ignored. If they are being tracked, then information identifying the LOB table is updated to reflect that the objects of the base table 120 for the LOB are being tracked. Finally, the LOB control block 360 for the tracked LOB is added in the LOB Map Table Map 350. In turn, the LOB Map Table Map 350 is added to the list stored in the Anchor 184 for later access during processing.

Figure 4C:
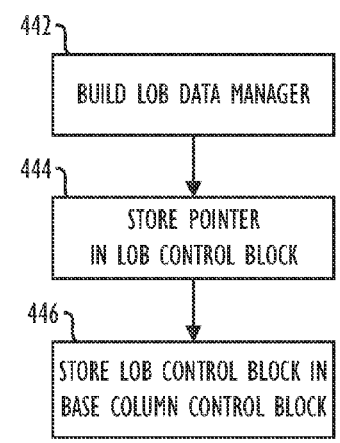

As noted above in Block 440, a LOB Data Manager 320 is created when objects in the base table 120 for a LOB are being tracked. As shown in the steps of FIG. 4C, a LOB Data Manager 320 is built to manage the reading and writing of LOB data in the VSAM store 330 for the tracked LOB (Block 442). Then, a pointer for the LOB Data Manager 320 is stored in the LOB control block 360 created previously for this tracked LOB so the appropriate Data Manager 320 can be accessed when subsequent records for the tracked LOB are encountered in the DB2 Log 160 and need to be inserted into the VSAM store 330 (Block 444). Finally, the LOB control block 360 is stored in a corresponding Table Column control block 392, which is a storage area for information on all the columns in the associated base table 120 (Block 446). Consequently, the LOB control block 360 is used as part of the link between information about a tracked LOB and information used to access data for that LOB in the VSAM store.

B. Handlers for Logged LOB Data Records

Figure 5:
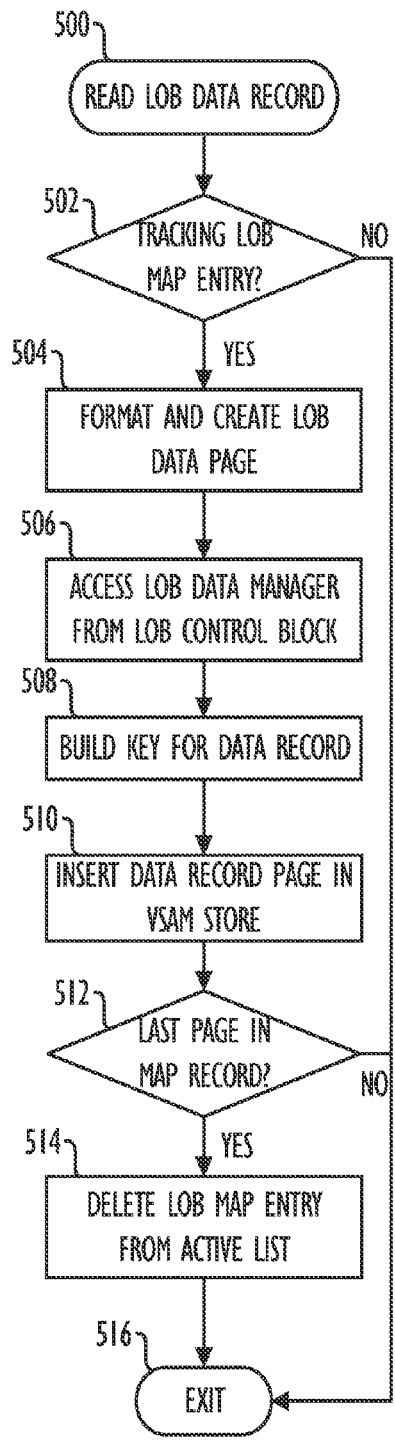
FIG. 5 illustrates, in flow chart form, one embodiment for handling data records of logged LOB data with the mechanism of FIG. 3A.

As mentioned briefly above, a LOB Data Handler 316 handles logged data records 176 for a tracked LOB. Therefore, the LOB Data Handler 316 is used after a map record 174 for the tracked LOB has been already encountered so that the data records 176 may be properly handled. Operation of a LOB Data Handler 316 is shown in flow chart form in FIG. 5.

Initially, a data record 176 is read from the log records 170 in the course of reading the DB2 Log 160 with the Mechanism 300 (Block 500). When read, it is not immediately known if the map record 174 associated with the underlying LOB for this logged data record 176 has been encountered yet. Accordingly, the LOB Data Handler 316 first checks to see if this data record 176 is associated with a tracked LOB (Decision 502). To do this, the Handler 316 checks the Active List 380 (See FIG. 3B) for a LOB Map Entry 382 having a ROWID and a version number that match what is contained in the logged data record 176. If there is no matching Map Entry 382, the logged data record 174 is ignored, execution exits at Block 516.

If there is a matching Map Entry 382, then the Handler 316 formats the logged data record 176 to create a data page for eventual storage in the VSAM store 330. To ensure proper handling, the Handler 316 accesses the appropriate LOB Data Manager 320 using the LOB control block 360 previously created for the associated LOB (Block 506). To do this, the Handler 316 calls a search routine from the LOB Map Table Map 350 (See FIG. 3B) stored off the Anchor 184 and passes information, such as the database object identifier (DBID), the page set identifier (PSID), the object identifier (OBID), and the log point RBA from the logged data record 176. The search routine uses the passed information to search the LOB Map Table Map 350 and obtain the proper LOB control block 360 for the LOB. Then, a pointer to the appropriate LOB Data Manager 370 is obtained using the LOB control block 360.

Once accessed, the LOB Data Handler 316 builds a key for the data page (Block 508) and passes this information to the LOB Data Manager 370 to insert the key and data page together into a record of the VSAM store 330 (Block 510). Then, the LOB Map Entry 382 (See FIG. 3B) is preferably checked to determine if this inserted page is the last data page to be tracked for the LOB. If not, the operation exits 516 until further data records 176 are encountered. If the last page has been inserted, then the LOB Map Entry 382 is deleted from the Active List 380 because there will essentially be no more data records currently logged for the LOB.

C. Handlers for Low-Level Space Map Records

As mentioned briefly in FIG. 3A, the Mechanism 300 may read low-level space map records 178 logged for a LOB to determine whether certain data records are to be deleted for various purposes from the VSAM store 320. For example, a URID for a LOB log record 170 can indicate either that the unit of work is for a rollback or is to be committed or aborted. If a URID is for a roll back, for example, then previously handled data records 176 will not be kept and are to be deleted from the VSAM store 330. In this case, the Mechanism 300 preferably identifies the records in the store 330 associated with the rollback and deletes them from the VSAM store 320. To do this, the Mechanism 300 looks for any logged low-level space map records 178 that are de-allocation compensation records encountered in the DB2 Log 160 and deletes those records in the store 330 indicated by the low-level space map.

Figure 6:
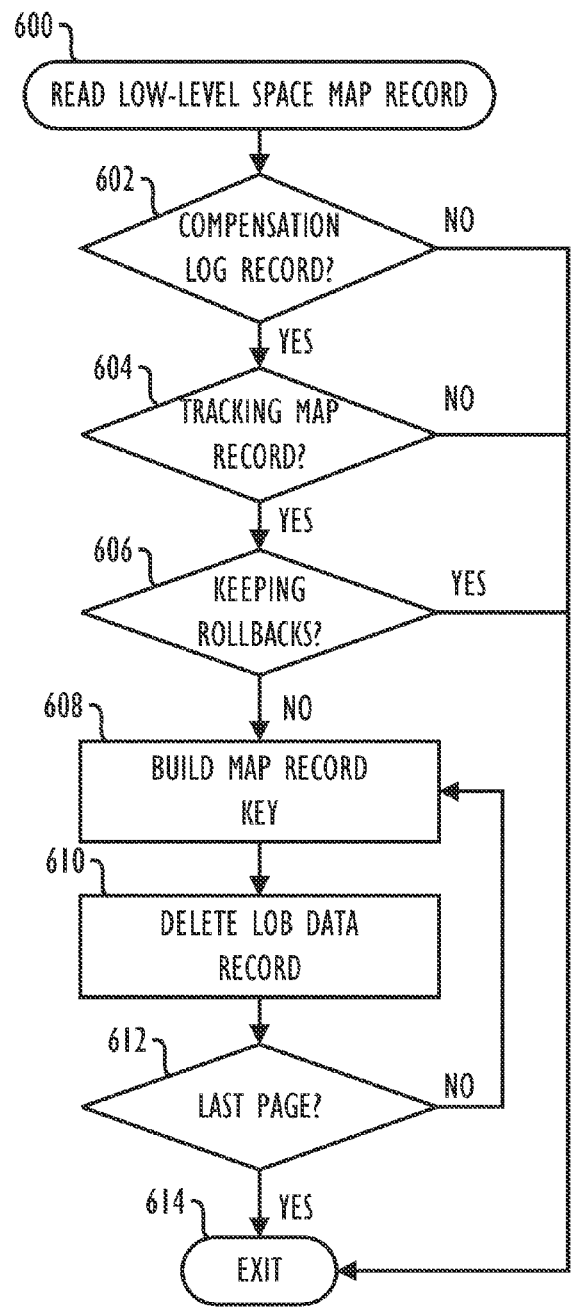
FIG. 6 illustrates, in flow chart form, one embodiment for handling low-level space map records of logged LOB data with the mechanism of FIG. 3A.

FIG. 6 shows how a low-level Space Map Handler 318 handles a low-level space map record 178. Initially, a logged low-level space map record 178 is read from the DB2 Log 160 (Block 600). As before, it is not known whether an associated LOB map record 174 has been read yet so a number of checks are made to verify that this logged record 178 is associated with a LOB of interest. First, a check is made to determine whether this low-level space map record 178 is a de-allocation compensation record (Decision 602). Then, the Handler 318 checks for a Map Entry 382 (See FIG. 3B) in the Active List 380 to check if this is a low-level space map record 178 for a LOB being tracked and whether the ROWID and version information in the record 178 matches those in the Map Entry 382 (Decision 604). A check is also made to determine whether the Mechanism 300 is currently configured to keep rollbacks or not, which may be preferred in some circumstances (Decision 606). If any of these checks fail, the Handler 318 may exit at Block 614.

If none of these checks indicate a failure, the Handler 318 is set to delete the LOB records associated with the low-level space map record 178. To delete the records, the Handler 318 must handle multiple sections of the VSAM store 320 so that the entire record can be sufficiently deleted and no fragmented data will be left in the VSAM store 320. To do this, the Handler 318 builds map record keys and deletes all of the data records associated with the map record keys in a looped operation (Block 308 through Decision 612) so the appropriate LOB data manager 320 can delete all of the pages indicated by the low-level space map record 178.

IV. Storing and Assembling Records in the VSAM Store

Previous discussions focused on how logged LOB records 170 are handled from the DB2 Log 160, are stored in the VSAM store 330, and are potentially deleted from the VSAM store 330. Now we turn to a more detailed discussion of how the logged LOB records 170 are inserted into the VSAM store 330 and are then reassembled for various purposes, such as data recovery, migration, back up, and reporting.

Figure 7:
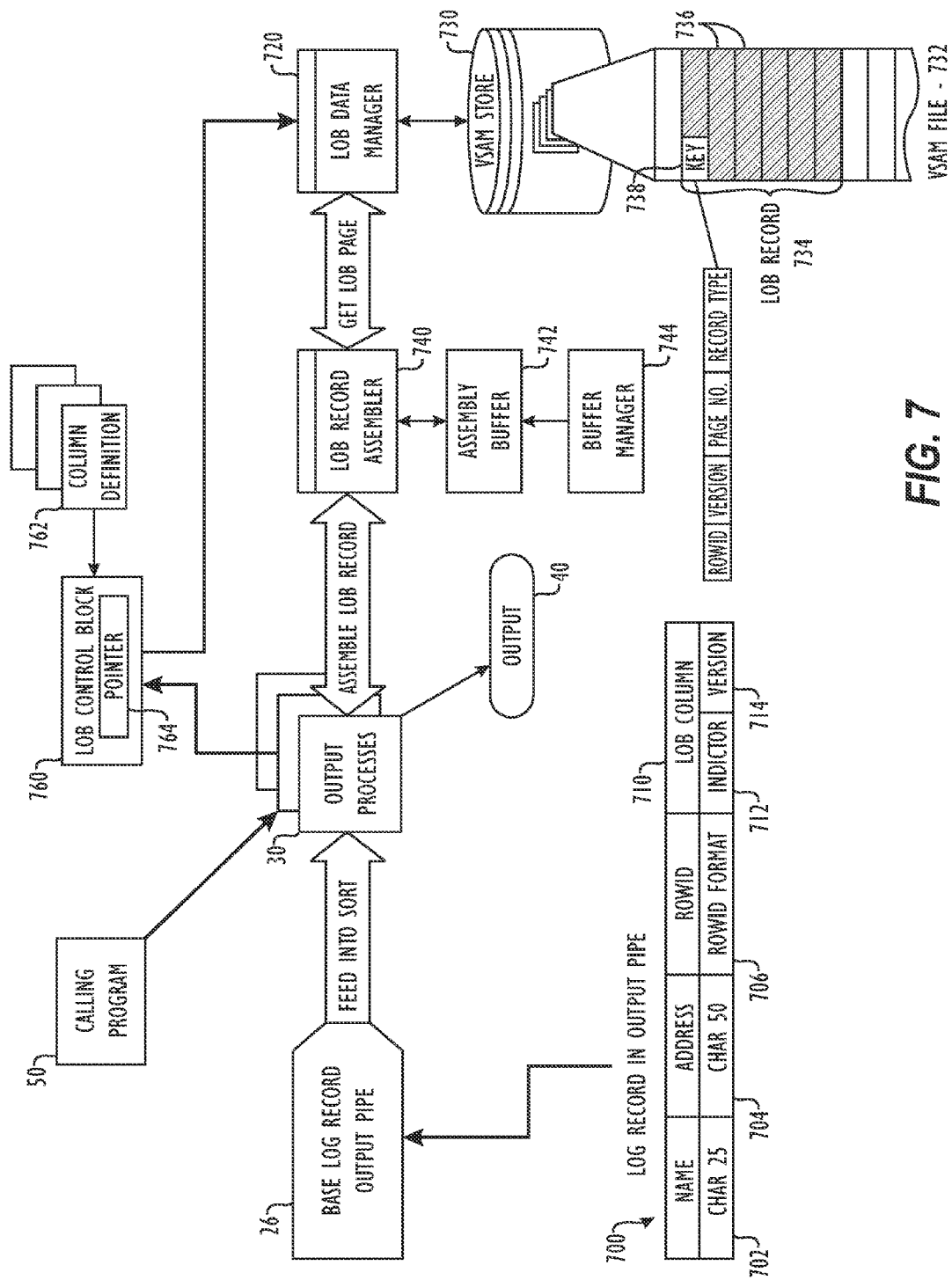
FIG. 7 illustrates one embodiment of assembling LOB log records with the mechanism of FIG. 3A.

FIG. 7 illustrates how various components of the LOB Log Handling Mechanism of FIG. 3 are used to insert logged LOB records into the VSAM store 730 and then assemble those records to build the LOB when called. In FIG. 7, the VSAM store 730 is shown with a VSAM file 732 having a LOB record 734. It is understood that the architecture of the VSAM store 730, file 732, and record 734 shown in FIG. 7 is only meant to be exemplary.

The LOB record 734 written in the VSAM file 732 can be comprised of multiple data pages 736. The size of the pages 736 for a record 734 can be 4K, 8K, 16K, or 32K, as determined by the buffer pool in which the auxiliary tablespace is defined. To avoid having memory problems due to the size of LOBs, the LOB records 734 are written a page 736 at a time into the VSAM store 730 by the associated LOB Data Manager 720. This is possible because the pages 736 all come in consecutive order when received in log records from the DB2 Log (not shown).

When writing a record 734 into the VSAM file 732, a key 738 is appended to the front of the record 734. The key 738 is used to index the records in the VSAM file 732 using KSDS techniques so that the records 734 can be located with the keys 736. As shown in FIG. 7, the key 738 is defined by a ROWID, a version number, a page number, and a record type. Two record types are defined. One record type indicates that this is a map page for the LOB, while the other indicates that this is for a data page of the LOB. The record 734, indicated as map page, will essentially contain all the information needed to re-read and assemble the entire LOB from the VSAM file 732.

With records 734 stored in VSAM files 732, it is possible to assemble the LOB using LOB Record Assemblers 740 when called to do so. The LOB Record Assemblers 740 use the LOB Data Managers 720 for the selection and retrieval of data, and one Assembler 740 is configured for each type of output requested by a calling program 50.

As shown, the calling program 50, such as BMC's Log Master, can use output processes 30 to produce output 40 from the base log record output pipe 26 created from the DB2 Log (not shown) in the same way discussed in FIGS. 1A-1B. During operation, information from the pipe 26 is fed into a sort process for the output processes 30, and the resulting output 40 can be used for various purposes of the calling program 50.

While the processes 30 are able to handle the general logical log records from the pipe 26 using conventional techniques, a logical log record in the pipe 30 may be encountered that is the result of a previous insert or update of a row in a base table containing a LOB. As the logical log records in the pipe 26 are fed into the processes 30, the processes 30 may detect a logical log record 700 having a LOB column 710. When this occurs, the LOB indicator field 712 in the LOB column 710 is checked to determine whether a real LOB data record has in fact been encountered and needs to be assembled using the data in the VSAM store 730.

If a logical log record 700 for a LOB has been encountered, the assembly process of the LOB is initiated. In general, a sorted output handler (38; FIG. 1B) for the corresponding output process 30 makes a call to assemble the LOB for the encountered log record 700. The assembly process then begins by first obtaining information for locating the appropriate map record 734 in the VSAM store 730 associated with the LOB of the encountered log record 700. First, a column definition 762 is obtained from internal control blocks that have row and column definitions for the log records in the pipe 26, and the column definition is used to locate the appropriate LOB control block 760 for the encountered log record 700 using such controls as the Table control block 390 and Table Column control block 392 (See FIG. 3B).

A pointer 767 to the appropriate LOB Data Manager 720 is then obtained from the LOB control block 760, and the pointer 764 along with the ROWID 716 and the version number 724 from the encountered log record 700 are all passed to an appropriate Assembler 740 to initiate assembly of the LOB record data. (Section V discusses how the pointer 764 in the LOB control block 760 can be used in calls by the Assembler 740 to access the VSAM files 732 in the VSAM store 730.) Preferably, the Data Managers 720 are organized in the same way as the base tables in the DB2 database system so that there is a Data Manager 720 for each partition in the base tables. In this way, the corresponding Data Manager 720 can be accessed from an array of pointers that are organized by the partition numbers of the base tables in the DB2 database system.

Using the passed information, the Assembler 740 constructs the appropriate key 738 and locates the appropriate map record 734 in the VSAM file 732 of the store 730 with the key 738. Using the obtained map information, the Assembler 740 determines how many data pages there are and builds a collection of plans of the data pages for building the LOB from the data records 734 in the store 730. The collection of plans are associated with separate map sections of the LOB, where each map section represents a consecutive group of data pages containing data for the LOB in the VSAM file 732. Each plan, therefore, maps out a section of a consecutive group of data pages in the VSAM file 732 for building the LOB. Once the plan of data pages is built, the Assembler 740 reads each data page 736 according to the plan, strips any control information from the read data page 736, and builds the LOB record from the remaining data portions.

Preferably, the Assembler 740 builds the LOB by concatenating the remaining data from the read data pages 736 into an assembly buffer 744. Preferably, space in the buffer 746 is not allocated and deleted on a per LOB record basis. Instead, a buffer manager 744 allocates the buffer 742 with a predefined size and dynamically adjusts the available space in this buffer 742 based on increases in size of the assembled data. The buffer manager 744 preferably cannot decrease the buffer 342's size. After all plans have been executed and the reassembled LOB record is intact in the buffer 744, the address to the assembly buffer 744 is passed back to the calling program 50, which can then use the assembled LOB record according to the program's design.

V. Additional Discussion of Elements in FIG. 3B

As mentioned above, the following section will discuss additional details of the mechanism shown in FIG. 3B. The LOB MAP Table Map 350 is like the Table MAP object 182, which is a control block that contains DB2 catalog information about a particular base table and is currently used in BMC's Log Master. The LOB MAP Table Map 350 is used to store information on LOB control blocks 360. The LOB MAP Table Map 350 also contains code to handle multiple instances of the same LOB control block 360 that may develop over time due to a particular LOB table being dropped and recreated. For locating and accessing information, the LOB MAP Table Map 350 is part of the global anchor 184 along with the Table MAP object 182.

The LOB Map Entry 382 is a control block that acts as a container for the ROWID, version number, and last page number to be read for a logged LOB record. The LOB Map Entry 382 is used to represent an active LOB being tracked and is stored in the Active List 380. The Active List 380 is a collection of items, preferably in a list. A Log Handler Control program uses the Active List 380. The Log Handler Control program is a managing program for BMC's Log Master that coordinates all of the handlers, including those handlers 314, 316, and 318 for LOB's, and that has central functions for use by multiple handlers. The Active List 380 and the LOB Map Entries 382 are the only place checked by the LOB Data Handlers 316 and Low Level Space Map Handlers 318 to determine if a data record 176 or a low-level space map record 78 for a logged LOB record is to be processed or not.

The LOB Control Block 360 is a control block somewhat like a conventional Table control block. However, the LOB control block 360 also contains information that is conventionally only kept in a Table Space control block. When a LOB is involved, there is only one auxiliary table per auxiliary tablespace in the DB2 database system. The LOB control block 360 also contains a pointer to the Table control block for the base table of the underlying LOB so that dynamic filtering can be accomplished.

Preferably, the Table control block keeps a list of all LOB control blocks 360 associated with it for any back referencing and clean up processing that may be needed. The Table Column control block 392 keeps an array of pointers to LOB control blocks 360 for each LOB column.

The LOB Data Manager 320 (See FIG. 3A) requires several objects to be defined, which include a LOB Data object and a LOB VSAM object. The LOB Data object is used to represent a single LOB record and contains the key for the VSAM store and a variable array or data area that represents the data. One data area can be allocated per LOB column of the base table and can be reused for each record in that LOB column.

The LOB VSAM object is used to represent the VSAM file 332 (See FIG. 3A) into which the LOB Data records are written and is used when creating, deleting, opening, and closing a VSAM file 332. LOB VSAM objects are listed in the LOB Data Manager 370's control block which manages/controls them (See FIG. 3B). During operation, the LOB VSAM objects are accessed by the LOB Data Manager 720 through calls by the assemblers 740 to access the VSAM files 732 in the VSAM store 730 (See FIG. 7). For example, these LOB VSAM objects are used through calls to the IDCAMS program, which is an IBM program to create and manipulate VSAM data sets. The correct LOB Data Manager for a LOB is accessed using the partition number for that LOB which is found in the DB2 catalog table 180, SYSAUXRELS. Because LOBs are associated with a specific column in a base table 120, an array of LOB control blocks are stored in a list maintained in the base tables column control block 392 (See FIG. 3B).

The foregoing description of preferred and other embodiments is not intended to limit or restrict the scope or applicability of the inventive concepts conceived of by the Applicants. Although the present disclosure has been described with reference to DB2, it will be appreciated that the teachings of the present disclosure can be applied to other relational database management system and to database systems, such as Oracle and Sybase. In exchange for disclosing the inventive concepts contained herein, the Applicants desire all patent rights afforded by the appended claims. Therefore, it is intended that the appended claims include all modifications and alterations to the full extent that they come within the scope of the following claims or the equivalents thereof.

What is claimed is:

1. A method, comprising:
   accessing logged Large Object (LOB) data associated with a target LOB included in a plurality of tracked LOBs within a relational database;
   determining that a change to the target LOB is to be tracked;
   defining a key to index the logged LOB data in response to the determining;
   storing the key in a first store;
   storing the logged LOB data in a second store; and
   creating a plurality of controls identifying the plurality of tracked LOBs and including an active list having an entry for each of the plurality of tracked LOBs, each entry including:
      a ROWID from a base table associated with each tracked LOB from the plurality of tracked LOBs,
      a version number of each tracked LOB from the plurality of tracked LOBs, and
      a number indicating a last data page of each tracked LOB from the plurality of tracked LOBs.

2. The method of claim 1, wherein the relational database includes a DB2 database.

3. The method of claim 1, wherein the accessing includes accessing the logged LOB data directly from the relational database.

4. The method of claim 1, wherein the accessing includes accessing the logged LOB data from a log utility associated with the relational database.

5. The method of claim 1, wherein the determining includes correlating the logged LOB data with a base table associated with the target LOB.

6. The method of claim 1, wherein the key is based on the logged LOB data.

7. The method of claim 1, wherein the key includes a ROWID, a version number, and a page number.

8. The method of claim 1, further comprising maintaining the first and second stores separate from a third store used to store other logged data from the relational database.

9. The method of claim 1, wherein the first store and the second store are included in a single storage element.

10. The method of claim 1, wherein at least one of the first store or the second store includes a Virtual Storage Access Method file.

11. The method of claim 1, wherein at least one of the first store or the second store includes a Key Sequenced Data Set for storing records.

12. The method of claim 1, wherein the determining includes using the plurality of controls to determine whether changes to the target LOB associated with the logged LOB data are to be tracked.

13. The method of claim 1, wherein the plurality of controls is a plurality of first controls,
   the method further comprising creating a plurality of second controls for the plurality of tracked LOBs, each of the plurality of second controls linking base table information for the plurality of tracked LOBs to access information for accessing the second store.

14. The method of claim 1, wherein the plurality of controls is a plurality of first controls,
   the method further comprising creating a plurality of the second controls each including a first pointer to base table information and a second pointer to access information.

15. A program storage device, readable by a programmable control device, comprising instructions stored on the program storage device for causing the programmable control device to perform the method according to claim 1.

16. A computer system being programmed to perform the method according to claim 1.

17. A method, comprising:
   storing, in a first store, a key configured to index logged Large Objects (LOB) data stored in a second store and associated with a relational database, the second store including data pages;
   receiving a call from a caller to assemble target LOB data based on the logged LOB data;
   accessing a map record associated with the target LOB data in the second store in response to the call and based on the key;
   accessing a portion of the data pages using a plan based on the map record;
   assembling the target LOB data in an assembly buffer based on a concatenation of at least a portion of the logged LOB data at the portion of the data pages; and
   making an address of the assembly buffer available to the caller.

18. A method, comprising:
   accessing logged Large Object (LOB) data associated with a target LOB included in a plurality of tracked LOBs within a relational database;
   determining that a change to the target LOB is to be tracked;
   defining a key to index the logged LOB data in response to the determining;
   storing the key in a first store;
   storing the logged LOB data in a second store;
   receiving a call from a caller to assemble at least a portion of the logged LOB data associated with the target LOB;
   accessing the at least the portion of the logged LOB data in the second store in response to the call;
   assembling the at least the portion of the logged LOB data in an assembly buffer; and
   making an address of the assembly buffer available to the caller.

19. The method of claim 18, further comprising:
   accessing a map record associated with the at least the portion of the logged LOB data in the second store using a key based on information in the call; and
   accessing data pages using a plan based on the map record.

* * * * *